Aug. 20, 1968 P. EMBREE 3,398,396

DIVERSITY SEISMIC RECORD STACKING METHOD AND SYSTEM

Filed June 13, 1966

INVENTOR:
PETER EMBREE

D. Earl Richards
ATTORNEY 3,398,396
DIVERSITY SEISMIC RECORD STACKING
METHOD AND SYSTEM
Peter Embree, Farmers Branch, Tex., assignor to Texas
Instruments Incorporated, Dallas, Tex., a corporation of Texas
Filed June 13, 1966, Ser. No. 557,126
6 Claims. (Cl. 340—15.5)

ABSTRACT OF THE DISCLOSURE

Disclosed is a method of enhancing the signal-to-noise ratio in seismic records, which comprises the steps of generating at a detector location seismic traces resulting from a plurality of closely spaced seismic shots, amplifying each trace as a function of the inverse ratio of the noise power in said trace as compared to another trace, and then combining said modified traces.

---

This invention relates to the production of a stacked seismogram and more particularly to combination of traces after modification of each trace in dependence upon the amplitude of the signal components therein and noise components in each trace so that the summation will have a maximum signal-to-noise ratio.

In a more specific aspect, the invention involves modifying the amplitudes of a plurality of traces, each inversely with respect to its noise power following which the modified traces are combined to produce a stacked output trace.

In many seismic operations, relatively weak seismic sources are employed, resulting in the signal components of a resultant seismic trace being lower in amplitude than the amplitude of the uncorrelatable or ambient noise energy. Where stronger sources are employed, the noise level may still exceed the signal level. Notwithstanding such unfavorable relationships, it has been found that seismic traces having poor signal-to-noise character can be combined or stacked such that the signal components will be added while the noise components will tend to cancel one another.

The present invention is based upon the discovery that modulation of the amplitudes of the traces in dependence upon the noise amplitude prior to stacking results in an optimum signal-to-noise ratio in stacking such modulated traces.

In accordance with the invention, there is provided a method of optimizing signal-to-uncorrelatable noise in stacking of seismic traces where a plurality of traces are produced in an environment characterized by noise of varying amplitudes. More particularly, the amplitudes of at least a portion of two traces are modulated inversely with respect to the noise power in each such portion following which the traces are stacked. In a preferred embodiment of the invention, control voltage functions are generated in proportion to the squares of trace amplitudes for late data gates in each of the traces to be stacked and the amplitudes of the entire traces are altered inversely as their respective control voltage functions prior to trace stacking.

In a further aspect of the invention, each trace is divided into a plurality of frequency bands with a separate control function being generated in dependence upon the ambient noise in each such frequency band and with the signal and noise in such frequency band then being modified inversely as the square of the amplitude of the ambient noise in such band.

Figure 1:
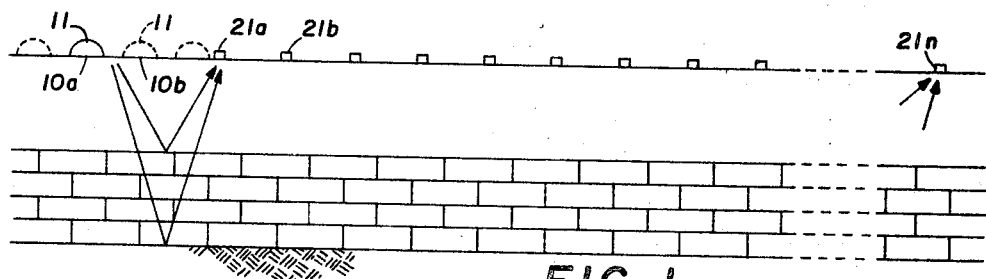
Figure 2:
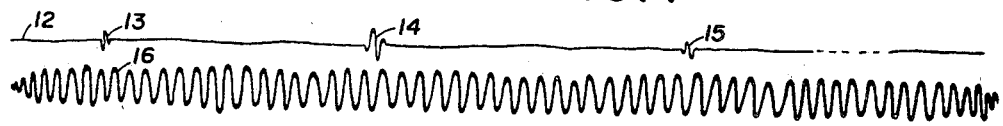
Figure 3:
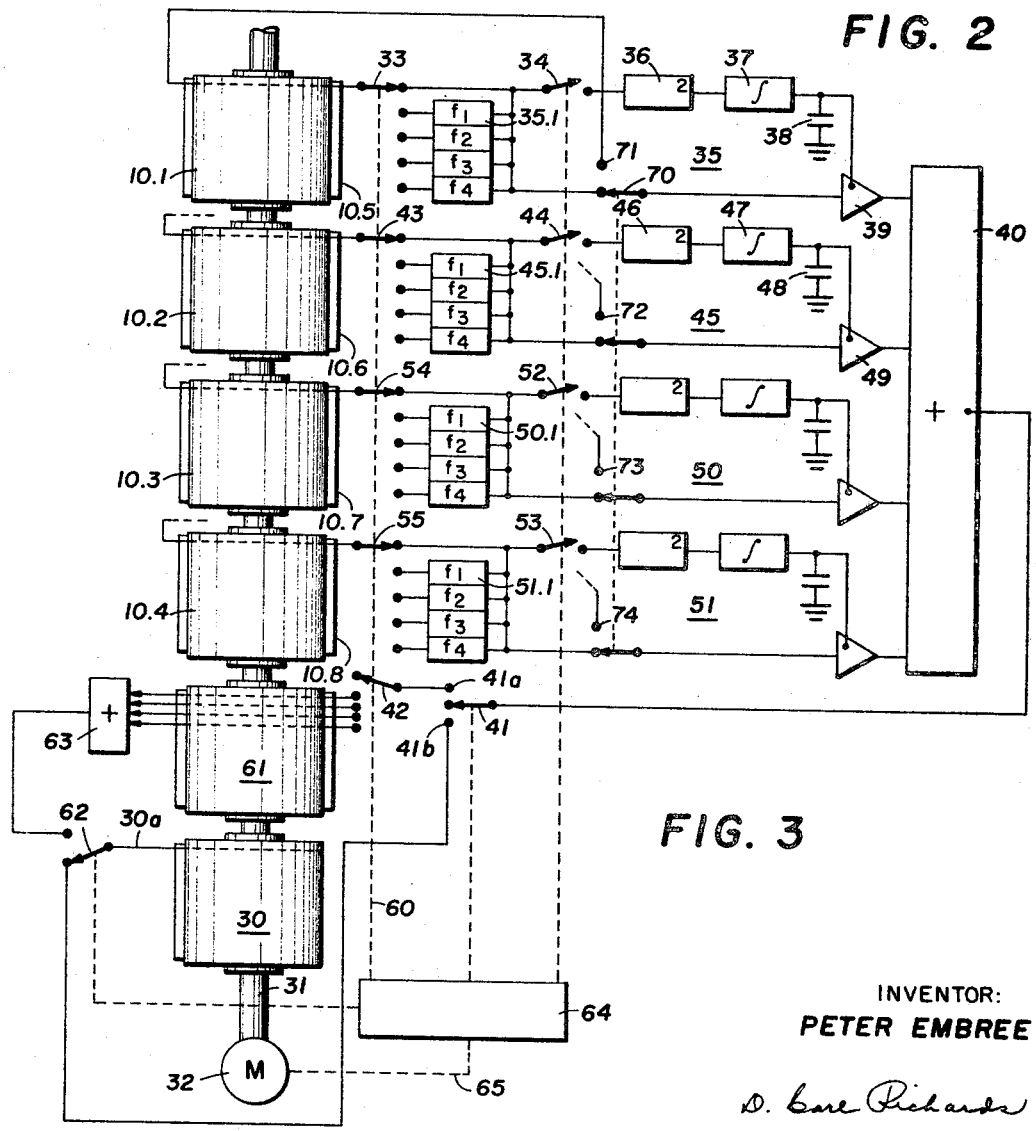

For a more complete understanding of the present invention and for further objects and advantages thereof, reference may now be had to the following description taken in conjunction with the accompanying drawings in which:

FIGURE 1 illustrates a method of seismic exploration in connection with which the present invention is employed;

FIGURE 2 diagrammatically illustrates signal amplitudes produced in the system of FIGURE 1 and uncorrelatable or ambient noise present in the spread of FIGURE 1; and FIGURE 3 diagrammatically illustrates a system embodying the present invention.

Field operation (FIGURE 1)

Referring now to FIGURE 1, a seismic source at location $10a$ comprises a quantity of gas detonated in a chamber 11. Seismic waves thus produced are detected in a spread including detectors $21a$, $21b$, ... $21n$. The seismic record is a multi-trace record where each separate trace is a reproducible recording of the signal from one of the detectors $21a$–$21n$. Thereafter, the chamber 11 is moved to a location $10b$ where a second seismic event is initiated by detonation of gas in chamber 11. A second seismogram is thus produced. In similar manner, a plurality of additional seismograms are obtained by moving the chamber 11 to a plurality of locations in a shot pattern array while leaving the detectors $21a$–$21n$ fixed in location. One trace on each such seismogram corresponds with the signal detected by detector $21a$. After such records are obtained, they are normally stacked on a trace-by-trace basis so that a single composite seismogram is produced. The procedures for enhancement of signal-to-noise energy thus far described are well known.

The present invention is directed to further improving the signal-to-noise character of the composite traces. It has been found that because of variations in the ambient noise, the traces can be individually treated before stacking so that the resultant composite seismic record will be improved over any that would be obtained in accordance with prior art techniques.

Signal and noise character (FIGURE 2)

With reference to FIGURE 2, the trace 12 includes a time break 13 which represents the instant of detonation of gas in chamber 11. The pulse 14 represents a reflection from a relatively shallow reflection bed. The pulse 15 represents a reflection from a deeper bed.

In contrast with the relatively low amplitude reflections 14 and 15, ambient noise, not generated nor correlatable with acoustic energy produced by detonation of gas in chamber 11, often is of substantially higher amplitude. Trace 16 may be taken as indicative of the ambient noise. The amplitude of trace 16 is noticeably greater than the amplitude of the reflection signals 14 and 15.

The ambient noise is found to vary with time so that some of the records produced in accordance with the method above described will have much higher noise components relative to signal than others. The signal components may be considered generally to have about the same amplitudes.

Applicant has found that by superimposing a gain function on each trace prior to stacking with any other trace as to modify the trace amplitude inversely proportional with respect to the power of the noise energy, the signal-to-noise ratio of the stacked seismogram is optimized.

Diversity stack (FIGURE 3)

Referring now to FIGURE 3, a multi-record playback and record system has been illustrated where records 10.1–10.4 are mounted on a drum for playback of traces thereof prior to compositing on a magnetic record 30. The drums are driven by a motor 32. The records 10.1–10.4 are mounted with the time breaks thereon in alignment. While channels relating to all traces on the four records may be implemented for parallel operation, only the channels for modifying and summing one trace from each of the four records has been illustrated in FIGURE 3. More particularly, a channel 35 leads from a pickup head associated with record 10.1 so that trace 1 of record 10.1 will appear on channel 35. Channel 35 includes a squaring unit 36, an integrator unit 37, and a storage unit 38 illustrated in the form of a capacitor. The output of the storage unit 38 is applied to a gain control terminal of an amplifier 39 which forms a second branch of channel 35. The output of amplifier 39 is applied by way of summing unit 40 to a recording channel 30a associated with trace 1 on record 30. Channel 45 for trace 1 of record 10.2 similarly includes two branches for control of amplifier 49 by means of the squaring unit 46, integrator unit 47, and storage unit 48.

Channels 50 and 51 similarly lead from trace 1 on records 10.3 and 10.4 to the unit 40.

In operation, the drums are rotated on shaft 31 at a constant speed past the four banks of pickup heads 10.5, 10.6, 10.7, and 10.8. During a first drum cycle, a switch 34 in channel 35 will be closed during a data gate preferably late in the record time of record 10.1. The noise power thus is evaluated by the squaring unit 36 and the integrator unit 37. A voltage proportional to the noise power is then stored on condenser 38. Such voltage is applied as a bias voltage to amplifier 39. The amplifier thus biased causes the signal passing through amplifier 39 to be modified inversely as the noise power. The same is true of the signals passing through channels 45, 50, and 51, which include data gate selecting switches 44, 52, and 53, respectively, coupled together to select the same gate. Thus, during the second revolution of the drum 31, switch 41 is closed so that trace 1 on record 30 will be a composite or stacked trace representing the sum of trace 1 on each of records 10.1–10.4.

The operation thus described assumes that the ambient noise remains constant over the interval during which each of records 10.1–10.4 was recorded. In practice, this has been found to be a reliable assumption. In seismic record stacking methods where the signal amplitude is sufficiently low, the noise power may be evaluated other than at late record times. However, a late record time is preferred because of the probability of freedom from presence of correlatable noise.

VERIFICATION

The favorable results achieved by operation of the system of FIGURE 1 in accordance with the foregoing description has been verified in practice and in theory. The following explanation will be of assistance in understanding the operation as above described.

The foregoing description has been based upon the assumption that the signal energy from the source would be substantially constant for successive shots. The following derivation treats the general case, assuming that there may be varying amounts of signal energy. Further, the noise energy may vary in intensity between the times that the successive seismic events are initiated and records 10.1–10.4 are obtained. The relationship between the signal and noise constituents for two successive seismic events may be expressed as follows:

$$a_1 S + b_1 N \quad (1)$$
$$k a_2 S + k b_2 N \quad (2)$$

where:
$a_1$ is a scalar function in record 1;
S is the signal;
N is the noise;
$b_1$ is the scalar for RMS noise in record 1;
$a_2$ is the scalar for signal energy in record 2;
$b_2$ is a scalar for noise energy in record 2; and
$k$ is a factor to be applied to record 2 before summing the same with record 1.

The signal and noise power may be expressed as follows:

$$(a_1 + k a_2)^2 S^2 + (b_1^2 + k^2 b_2^2) N^2 \quad (3)$$

The ratio of signal power to noise power is significant and may be expressed as follows:

$$\left(\frac{S}{N}\right) = \frac{(a_1 + k a_2)^2 S^2}{(b_1^2 + k^2 b_2^2) N^2} \quad (4)$$

From this ratio, the derivative of the signal-to-noise power with respect to the scalar function $k$, when set equal to zero, will provide an indication of the optimum basis for combining two traces. More particularly, the derivative may be expressed as follows:

$$\frac{\delta(S/N)}{\delta k} = a_2 - \frac{(a_1 + k a_2) b_2^2 k}{b_1^2 + k^2 b_2^2} = 0 \quad (5)$$

Equation 5, when solved for the scalar $k$, gives the result:

$$k = \frac{a_2 b_1^2}{a_1 b_2^2} \quad (6)$$

Properly interpreted, Equation 6 means that since the multiplier factor $k$ is proportional to the ratio $(b_1^2/b_2^2)$ for the noise, the signals should be combined with amplitudes inversely proportional to the square of the noise power in a given trace. This relationship is expressed in Equation 7:

$$\frac{S}{N^2} = \frac{\text{signal amplitude}}{\text{noise power}} \quad (7)$$

Since the signal power, by reason of time coincidence, is in phase, the signal power is proportional to the square of the sum of the amplitudes. In contrast, the noise power, because of lack of correlation in time, is proportional to the sum of the two input powers. Thus, if signal amplitude and noise amplitude both can be evaluated before stacking, an optimum stack would involve scaling a given record in proportion to the signal amplitude and inversely proportional to the noise power. If the signal is constant, the signal can be weighted in proportion to the inverse square of the noise. If the noise is constant, then the signal should be weighted by an amount proportional to the signal amplitude.

Frequency dependent scaling

Further in accordance with the present invention, the signals may be weighted in dependence upon the power in the noise components on a frequency selective basis. More particularly, if the switches 33, 43, 54, 55, and 42 are actuated as by linkage 60, to the second terminal associated with each such switch the signals from trace 1 on each of drums 10.1–10.4 will be applied through a first filter 35.1 in channel 35, filter 45.1 in channel 45, filter 50.1 in channel 50, and filter 51.1 in channel 51. The latter filters all have a frequency response $f_1$. Thus, during the first rotation of the shaft 31, the signal on the top trace on each of the four records will be passed through the filter $f_1$ so that control voltages for channels 35, 45, 50, and 51, proportional to the particular frequency band selected by filter $f_1$ for each of the four traces, will be stored. During the second cycle of the shaft 31, the switch 41 will be moved to the upper terminal 41a whereupon the top trace on drum 61 may comprise the frequencies from the top trace on drums 10.1–10.4 as selected by filter $f_1$ but modulated inversely as the noise component in the trace at that frequency band. Thereafter, the switches 33, 43, 54, 55, and 42 will be again moved to apply the trace throught filters $f_2$ to produce a second set of gain control voltages. Following this, a second trace will be recorded on drum 61 which represents the trace 1 modulated inversely as the square of the noise on trace 1 for the frequency band selected by filter $f_2$. In a similar manner, traces 3 and 4 will be produced on drum 61, corresponding with the frequency bands selected by filters $f_3$ and $f_4$. Thereafter, the switch 62 will be connected to the output of a summing unit 63 so that the top trace recorded through this mode of operation on drum 30 will represent the summation of trace 1 from each of drums 10.1–10.4 modulated on a frequency dependent noise based correcting function.

A control unit 64 is shown mechanically coupled to: (a) a first bank of switches including the switches 33, 43, 54, 55, and 42; (b) a second bank of switches including the switches 34, 44, 52, and 53; (c) the switch 41; and (d) the switch 62. The unit 64 may thus be employed to control the switches automatically as a function of the number of revolutions of the shaft 31 as indicated by the linkage 65. Such a mode of operation in general is well known, one such operation being disclosed in U.S. Patent No. 3,039,558 to Romberg.

*Time variant control*

In the operation of FIGURE 3 described above, it was assumed that the noise amplitude was large compared to the signal amplitude and that the noise level would remain substantially constant over the entire recording interval for a given trace. This may not be the case under all conditions. It may therefore be desirable to provide for variation with time in the magnitude of the control voltage such as produced for the amplifiers 39, 49, etc. For such mode of operation, switches in bank 70 would be moved to the upper terminal such as terminal 71. With the circuit thus set up, the signal to be amplified by amplifier 39 is delayed relative to the signal employed to produce the control voltage in the unit 38. The time constant of the control voltage circuit would be adjusted so that the amplification of the amplifier 39 may vary along the length of each trace in dependence upon variations in noise amplitude.

Stated otherwise, the trace, as applied by way of switch 34 to unit 36, would be preceded by the same trace as applied to amplifier 39 so that the noise on any given portion of the trace would control the amplitude of the trace.

Thus, channel 45 in the time variant mode amplifies the signal appearing at terminal 72, channel 50 amplifies the signal appearing at terminal 73, and channel 51 amplifies the signal appearing at terminal 74. The time delay may be of the order of one-half the record length to accommodate the variation in signal-to-noise ratio from an early to a late record time. Alternatively, the delay may be much shorter, for example, 0.2 to 0.3 second, with the time constants of the gain control circuit suitably selected in dependence upon the delay to the end that amplifier gain at any instant will be appropriate to the noise and signal level on the seismic trace.

While four seismograms 10.1–10.4 have been shown in FIGURE 3, resulting from generation of a suite of seismic waves at each of the four locations indicated in FIGURE 1, it will be understood that in general, more traces than four will be stacked to aid in achieving signal-to-noise improvement. Stacking the signals in direct proportion to signal amplitudes and inversely proportional to noise power optimizes the stacking operations.

The provision of a gain control circuit having an adjustable or preselected time constant may be in accordance with practices well known in the art, as indicated by U.S. Patent No. 2,612,568 to Hemphill. In that case, a gain control system is disclosed having a time constant which is initially low and thereafter is changed to have a longer time constant. In the present case, the time constant would be substantially time invariant, fixed by preselection of circuit constants or of control parameters suitable relative to the rate at which noise level may change during the recording interval.

While the foregoing invention has been described in connection with operations wherein a relatively weak seismic source is used such as involved in detonation of a gas mixture as shown in FIGURE 1, it is to be understood that the method may also be applied with beneficial results to operations wherein the seismic events are created by the weight dropping techniques such as are well known in the art. The invention is particularly useful in connection with common depth point stacking techniques such as disclosed in U.S. Patent No. 2,732,906 to Mayne.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method of optimizing signal-to-ambient noise in a stack of seismic traces where the individual traces are produced in an environment wherein noise is present in varying amounts, which comprises:
    (a) establishing first and second control functions related one to the other inversely as the ambient noise in a first trace is related to the ambient noise in a second trace,
    (b) applying said first trace and said second trace to means modifying said first trace and said second trace in accordance with said first and second control functions, respectively, and
    (c) applying the modified traces to means summing said modified traces and producing an optimized output trace.

2. The method according to claim 1 wherein said first and second control functions are inversely proportional the squares of the ambient noise amplitude in said first trace and said second trace, respectively.

3. The method according to claim 1 wherein each individual trace is separated into a plurality of frequency bands and wherein said first and second control functions each comprises a plurality of control functions, one for each of said plurality of said frequency bands, and wherein the portions of said traces within said frequency band are modified inversely as the square of the amplitude of the ambient noise within said frequency band.

4. In seismic exploration, the method which comprises:
    (a) generating a first suite of seismic waves,
    (b) detecting in the presence of surface noise said first suite of seismic waves after reflection from a subsurface reflecting point to produce a first electrical seismic trace,
    (c) applying said trace to means modifying the amplitude of said first seismic trace inversely as the square of the noise amplitude therein,
    (d) generating a second suite of seismic waves,
    (e) detecting in the presence of surface noise said second suite of seismic waves after reflection from said reflecting point to produce a second electrical seismic trace,
    (f) applying said trace to means modifying the amplitude of said second trace inversely as the square of the noise amplitude therein, and
    (g) applying the modified traces to means combining them and producing an optimized seismic trace.

5. In seismic exploration the method which comprises:
    (a) producing a plurality of seismic disturbances spaced in time and location,
    (b) detecting at a given location seismic waves created by said seismic disturbances and reflected from subsurface structures,
    (c) converting said detected waves into electrical seismic traces,
    (d) applying said traces to means modifying their amplitudes as an inverse function of the ratio of noise power present in each of said traces compared to one of said traces, and (e) applying the modified traces to means summing them and producing an optimized seismic trace.

6. The method according to claim 5 wherein each individual trace is separated into a plurality of frequency bands and wherein the portions of each trace within a frequency band are applied to means modifying said portion within said frequency band as a function of the noise power within that portion.

References Cited

UNITED STATES PATENTS

| | | | |
|---|---|---|---|
| 2,910,692 | 10/1959 | MacKiernan | 343—17.1 |
| 3,149,333 | 9/1964 | Campbell | 343—17.1 |
| 3,162,756 | 12/1964 | Lawrence. | |
| 3,281,776 | 10/1966 | Ruehle | 340—15.5 |
| 3,295,099 | 12/1966 | Lawrence et al. | 340—15.5 |

RODNEY D. BENNETT, *Primary Examiner.*

C. E. WANDS, *Assistant Examiner.*